(No Model.)
D. H. WILSON.
BATTERY.
No. 514,979.   Patented Feb. 20, 1894.
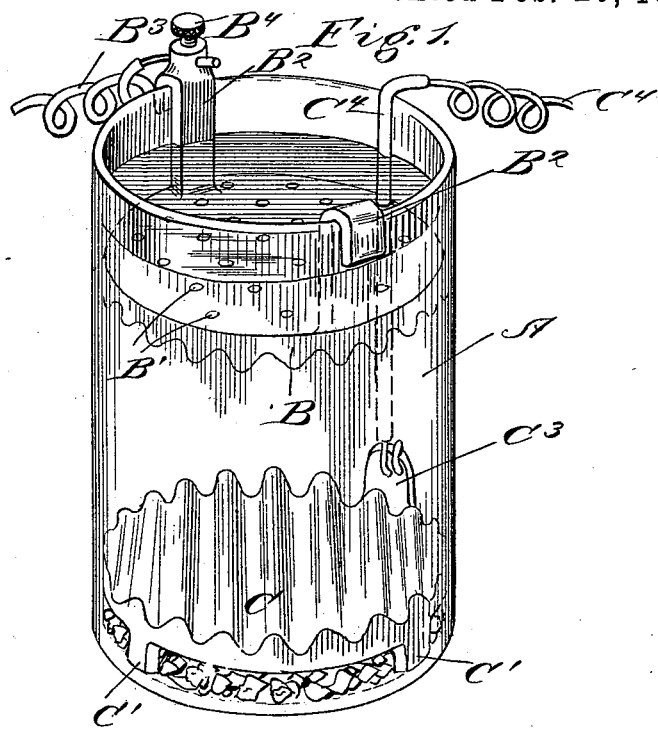
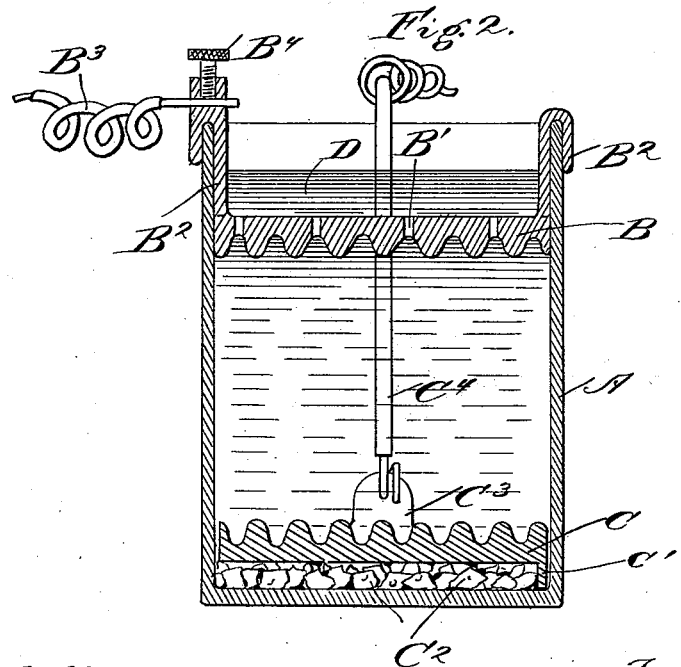
Witnesses:
Charles Burnap
Walter J. Gunthorp
Inventor:
David H. Wilson
By Francis W. Parker, Att'y

UNITED STATES PATENT OFFICE.

DAVID H. WILSON, OF CHICAGO, ILLINOIS.

BATTERY.

SPECIFICATION forming part of Letters Patent No. 514,979, dated February 20, 1894.

Application filed September 8, 1893. Serial No. 485,101. (No model.)

*To all whom it may concern:*

Be it known that I, DAVID H. WILSON, a citizen of the United States, residing at Chicago, in the county of Cook and State of Illinois, have invented a new and useful Improvement in Batteries, of which the following is a specification.

My invention relates to primary batteries and has for its object the production of a more efficient battery than is now in use.

Referring to the accompanying drawings: Figure 1 is a perspective view of the battery. Fig. 2 is a vertical section of the same.

Like letters refer to like parts throughout.

A is a glass jar or cell containing the elements of the battery.

B is a zinc plate which is corrugated as shown and is provided with the holes B'.

$B^2$ $B^2$ are lugs on the zinc plate and are bent at the ends so as to form hooks by which the said plate is suspended. One of the lugs $B^2$ is used as one of the terminals of the battery and is provided with a hole through which the wire $B^3$ passes. Said wire is held in place by the set screw $B^4$.

C is a copper plate corrugated in a similar manner to the zinc plate B. This copper plate rests in the bottom of the jar or cell A and has legs C' C' which raise it from said bottom so as to allow room for the crystals of copper sulphate $C^2$.

$C^3$ is a lug on the copper plate C to which is attached the insulated wire $C^4$. This wire passes through a hole in the zinc plate B and forms the other terminal of the battery.

The jar A is filled with a solution of copper sulphate D.

The use and operation of my invention are as follows: When it is desired to start the cell a number of crystals of copper sulphate are first put into the jar A. The jar is then nearly filled with water and the plates C and B placed in position. When the circuit is completed through the cell a current of electricity is generated. The bubbles of air which come off of the copper plate C pass through the holes B' in the zinc plate B and rise to the surface of the liquid. The corrugations on the plates B and C give a very large surface for the action of the liquid and thus make these cells very much stronger in proportion to their size than the cells in common use.

I claim—

1. In a primary battery the combination of a zinc and copper plate with their broad surfaces exposed to each other, their exposed sides deeply corrugated, and a solution in which said plates are immersed.

2. In a primary battery the combination of a jar with horizontally disposed plates, one of copper the other of zinc and a solution in which they are immersed, said plates deeply corrugated on their opposed surfaces.

3. In a primary battery the combination of a jar with horizontally disposed plates, one of copper the other of zinc, and a solution in which they are immersed, said plates deeply corrugated on their opposed surfaces, the lower plate provided with legs which raise it slightly above the bottom of the jar to give room for the crystals of copper sulphate.

4. In a primary battery the combination of a jar with horizontally disposed plates, one of copper the other of zinc, and a solution in which they are immersed, said plates deeply corrugated on their opposed surfaces, the upper plate perforated so as to permit the escape of gas.

5. In a battery the combination of an upper zinc plate having lugs by which it is hung on the top of the jar, with a lower copper plate having legs whereby it rests upon the bottom of the jar, said plates deeply corrugated at their opposed surfaces.

DAVID H. WILSON.

Witnesses:
D. M. CARTER,
FRANCIS W. PARKER.